United States Patent [19]

Krammer

[11] Patent Number: 5,365,413
[45] Date of Patent: Nov. 15, 1994

[54] VEHICLE LIGHTING SYSTEM

[75] Inventor: Gert Krammer, Graz, Austria

[73] Assignee: Zizala Lichtsysteme GmbH, Wieselburg, Austria

[21] Appl. No.: 28,102

[22] Filed: Mar. 8, 1993

[30] Foreign Application Priority Data

Mar. 9, 1992 [AT] Austria .................................. 448/92

[51] Int. Cl.$^5$ ............................................ F21V 8/00
[52] U.S. Cl. ........................................ 362/32; 362/35;
 362/259; 362/263; 362/272; 362/286; 362/386;
 310/68 B; 340/468; 385/901
[58] Field of Search .................. 385/25, 26, 33, 89,
 385/901; 362/32, 228, 61, 80, 35, 238, 239, 250,
 269, 271, 272, 286, 287, 259, 263, 386; 340/468;
 310/68 B

[56] References Cited

U.S. PATENT DOCUMENTS

| | | | |
|---|---|---|---|
| 1,824,270 | 9/1931 | Holzman | 362/272 |
| 2,227,861 | 1/1941 | Petrone | 362/32 |
| 2,469,581 | 5/1949 | Slosar | 362/272 |
| 3,723,722 | 3/1973 | Van Iderstine | 362/35 |
| 3,751,655 | 8/1973 | Codrino | 362/32 |
| 3,761,706 | 9/1973 | Frey | 362/32 |
| 4,190,318 | 2/1980 | Upton, Jr. | 385/26 |
| 4,492,427 | 1/1985 | Lewis et al. | 385/26 |
| 4,626,065 | 12/1986 | Mori | 362/35 |
| 4,933,813 | 6/1990 | Berger | 362/32 |
| 5,031,990 | 7/1991 | Mori | 385/901 |

FOREIGN PATENT DOCUMENTS

| | | | |
|---|---|---|---|
| 367032 | 7/1991 | European Pat. Off. | |
| 3434536 | 8/1984 | Germany | |
| 3838770 | 11/1988 | Germany | |
| 4036122 | 11/1990 | Germany | |
| 124920 | 6/1986 | Japan | 362/32 |
| 2229263A | 8/1990 | United Kingdom | |
| 1555598 | 4/1990 | U.S.S.R. | 362/269 |

Primary Examiner—Ira S. Lazarus
Assistant Examiner—Alan B. Cariaso
Attorney, Agent, or Firm—Seidel, Gonda, Lavorgna & Monaco

[57] ABSTRACT

A vehicle lighting system having a central light producing unit and bundles of optical fibers for the transport of light to lighting fixtures is provided. The central light-producing unit has a defined axis and at least one light source for producing light. The central light producing unit includes means for rotating the at least one light source about the axis. The light system further includes at least one light guide for receiving and guiding light produced by the at least one light source to at least one lighting fixture. The at least one light source is preferably rotated about a support collar which has at least one light guide, but preferably a plurality, connected to the collar. The light guides are preferably equally spaced about the periphery of the collar and which light guides receive and transport the light to light fixtures appropriately arranged in or on the vehicle.

22 Claims, 4 Drawing Sheets

FIG.2
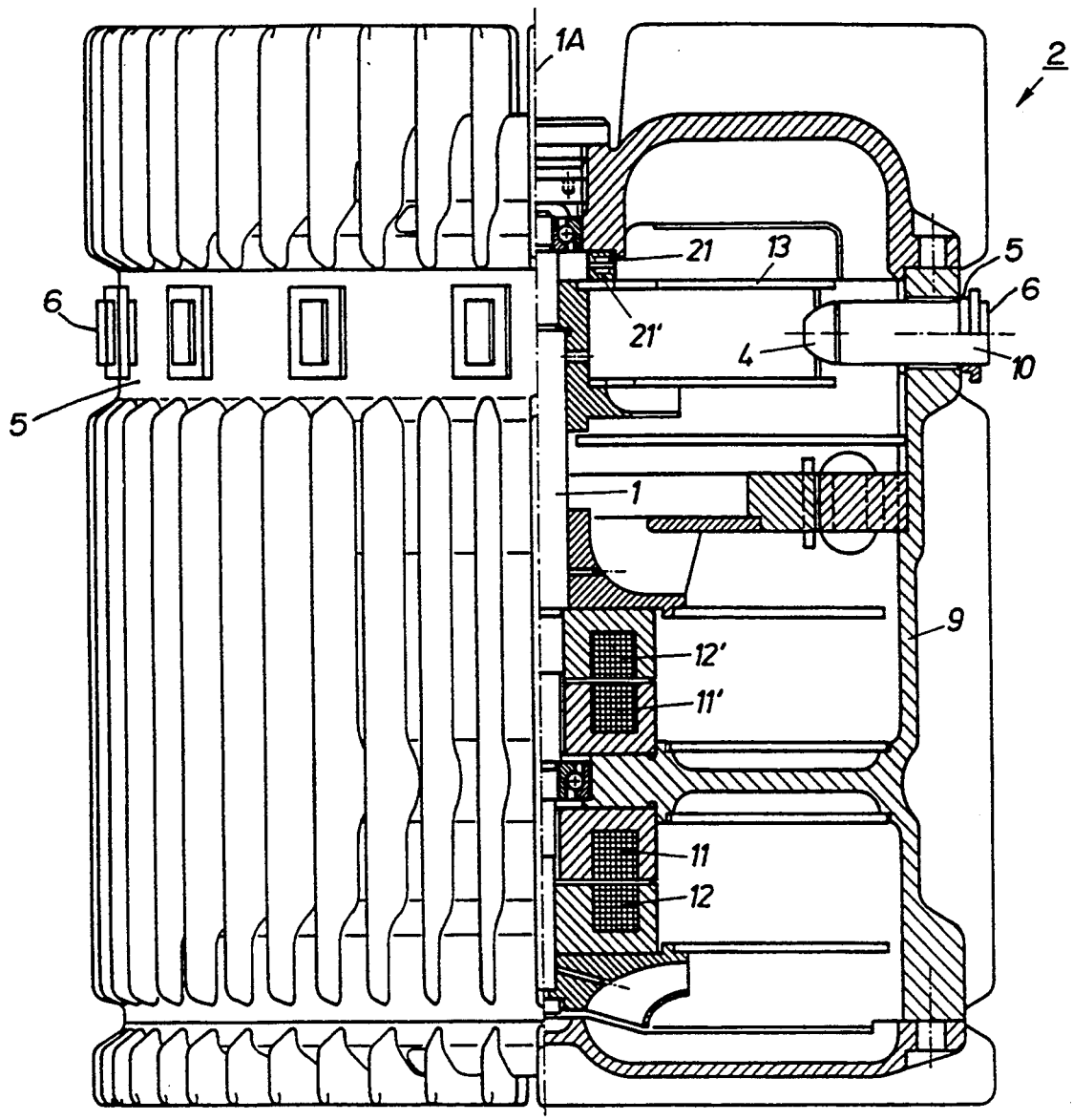
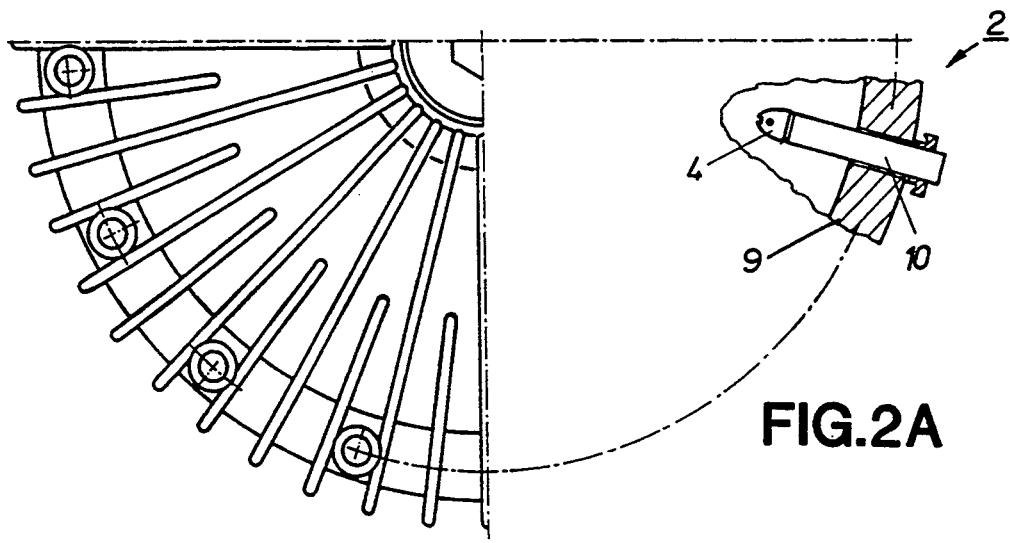
FIG.2A

VEHICLE LIGHTING SYSTEM

FIELD OF THE INVENTION

This invention relates to a vehicle lighting system with a central light producing unit and light guides for directing light to lighting fixtures of the vehicle.

BACKGROUND OF THE INVENTION

Lighting systems having a central light producing unit are known; e.g., one such system is disclosed in German patent document DE-OS 38 38 770 having counterpart U.S. Pat. No. 4,811,172, which is herein incorporated by reference. In the systems described in that reference, one high-intensity light source, which may be an incandescent lamp or possibly a gas discharge lamp and is continuously burning when turned on, and one reflector is positioned opposite a bundle of optical fibers to which the light rays are projected. The bundle guides the light to optical elements, like lenses, constituting the actual lighting fixtures from which radiation is emitted to the environment.

These systems have the following disadvantages, among others. A series of bundles of optical fibers is permanently associated with a continuous light source and each of the bundles is irradiated at the same time. Consequently, the lighting fixtures that are not in use have to be masked (causing a waste of energy) and it is not possible in such a system to cover or mask lighting fixtures emitting light independently of each other. Furthermore, continuous operation of light sources, such as those that emit high light energy, involves severe heat build-up because all "light channels" that are routed to the lighting fixtures are illuminated at the same time. Upon failure of the light source, the whole system loses illumination.

An object of the present invention is to provide a lighting system of this general type, but free of the disadvantages of prior systems.

SUMMARY OF THE INVENTION

According to the present invention, at least one, and preferably at least two, intermittently emitting rotating light sources are provided in the system. The present invention relates to a lighting system comprising a central-light producing unit having a defined axis and at least one light source for producing light. The light producing unit includes means for rotating the at least one light source about the defined axis. The light system further comprises at least one light guide for receiving and guiding light that is produced by the at least one light source to at least one lighting fixture. The light sources may be guided past the light guide channels, so that substantially the total light energy of the light source may be delivered to one of a plurality of light guide channels at a time during a predetermined short time interval. The light guide channels are arranged around the rotating light source(s) in a collar-like fashion, preferably equally spaced from each other in a uniformly distributed manner, and the number of light sources, number of revolutions and number of light guide channels are selectively integrated into one overall system, taking into account that, to the human eye, intermittent emission of light appears as continuous light if the emission frequency is greater than about 50 Hz. Here, it will be noted that in case of vehicle lighting, it is of course not only important that the light source be seen as continuous light, but also that objects moving relative to the vehicle, like the landscape, other vehicles, etc., be illuminated with a seemingly continuous light; i.e., the driver of the light-emitting vehicle must see these objects as being continuously illuminated.

Without being bound to this frequency data, it is at present assumed that a light emission frequency greater than about 100 Hz will be sufficient even for fast vehicles; however, in case of aircraft, this frequency might even be higher.

Thus, the invention primarily proposes to provide rotating light sources with corresponding collars supporting light guide channels about an axis. The supporting collar surrounds at least a portion of the circumference covered by the rotating light source. It is also possible that several of such light sources be provided on one rotor and which sources cooperate with appropriate light guide channels so that illumination for "lighting floors" purposes may be provided.

According to a further feature of the invention, light discharge flashlights (e.g., xenon tubes), preferably with spontaneous ignition or otherwise well-suited for "simmer-operation," are used instead of lamps providing permanent or continuous light, as the individual light guide channels are in any case only intermittently irradiated as a consequence of the rotating lamps being guided past the light guide channels. "Simmer-operation" is a widely-used technical term meaning that the lamps, when in use, are permanently energized, with the energy being applied to them being intermittently raised above the firing level of the lamp to cause illumination of the lamps. Gas discharge flash lamps per se are commercially available and their luminous density is second only to that of lasers and they normally operate completely free of time delay and fatigue with discharge times in the region from about a few microseconds to about a few milliseconds; i.e., xenon lamps can be turned on and off at substantially infinitely short intervals, so that it is possible to precisely flash each light guide channel, of a selected position, with high energy even in the case of high rotational speeds of the light source that may be needed, for example, because of the high number of light guide channels being serviced by the light source. Other light sources that may be advantageously employed with the lighting system according to the invention are halogen gas discharge lamps with heated filaments, and laser diodes.

According to the invention, the central "lighting generator" thus comprises of at least one, normally at least two, and preferably several, light sources, primarily gas discharge flash lamps, which are rotated about an axis and are guided past the front faces of corresponding light guide channels preferably arranged in a circle around the lamps, and which comprise bundles of optical fibers that are routed to individual "lighting fixtures" on the vehicle.

The light source is preferably mounted directly on a rotor, which preferably also is the rotor of a contactless electric motor, in particular a d.c. motor with electronic commutation. Motors of that kind are known and have very long service lives (or 80,000 hrs), even running at high speeds, e.g., between 2,000 and 6,000 rpm. Their service life is, as a practical matter, limited only by the service life of their bearings, so that undisturbed continuous operation for at least five years can be expected.

In the present invention, one part of the rotor cooperates with a transformer to supply electric energy to the flash lamps. The transformer has its primary windings disposed on the stator of the motor, and the secondary windings of the transformer, related to supplying energy to the lamps and to the motor itself, are disposed on both the rotor and stator of the motor. In this way, the individual light sources which are part of the rotor may be energized without contact and thus with little wear to the motor.

The windings at the rotor and stator may be distributed among several corresponding ring grooves, and in particular several secondary windings may be provided at the rotor.

Firing of the flash lamps is preferably done via known semiconductor power switches, in particular field effect power switches or power transistors of extremely low resistance when in their conductive state, so that only minor heating of the switching components occurs.

BRIEF DESCRIPTION OF THE DRAWINGS

The invention herein will be described in more detail by way of examples with reference to the drawings in which:

FIG. 2 is a partial-sectional view of a light generator comprising a contactless commutated motor;

FIG. 2A is a view showing a segment of the light generator of FIG. 2 so as to further illustrate the interrelation between the light sources and light passages thereof;

DETAILED DESCRIPTION OF THE PREFERRED EMBODIMENTS

Figure 1:
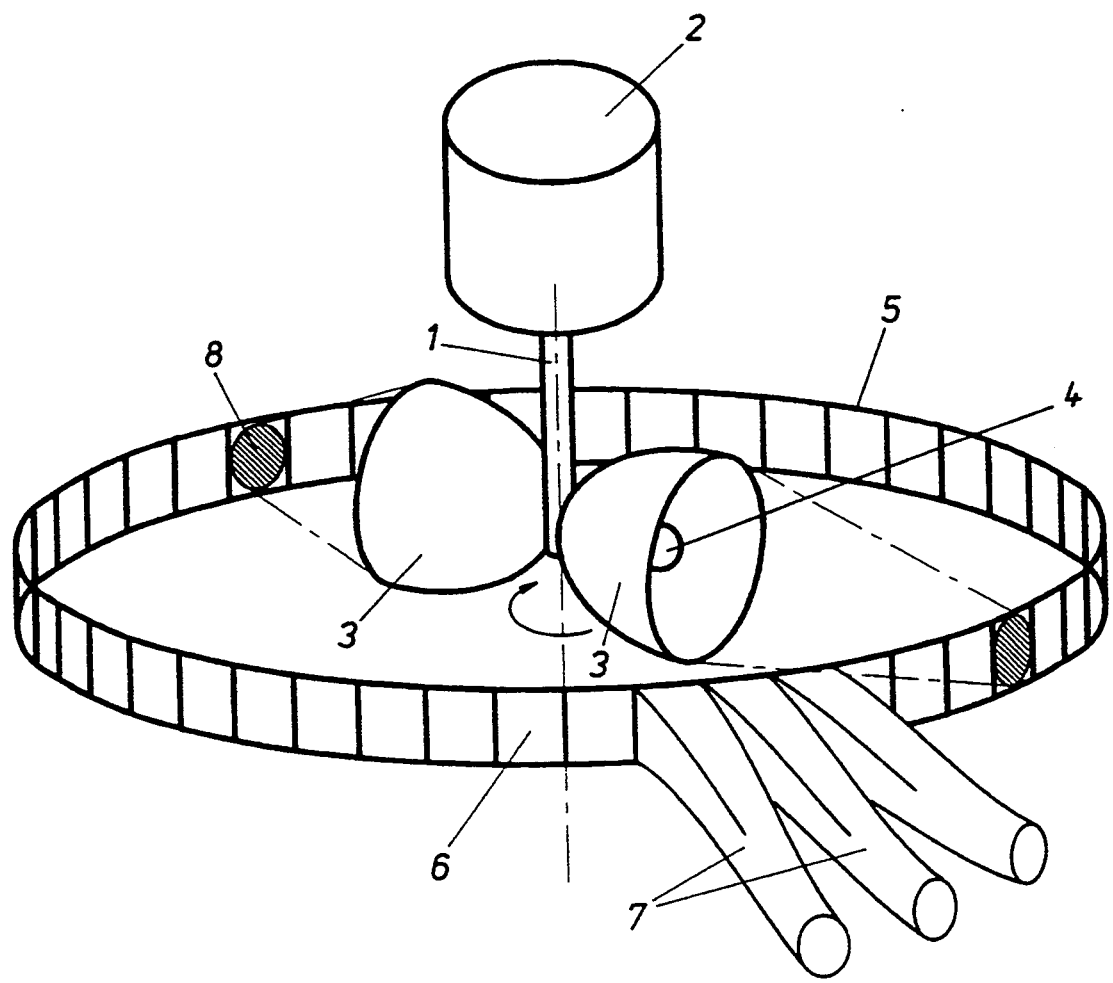
FIG. 1 diagrammatically shows the arrangement of rotating light sources within one collar about which light guide channels formed by bundles of optical fibers, are connected.

FIG. 1 shows two diametrically opposed light sources 4 arranged on the rotor shaft 1 of a driving motor 2 and provided with reflectors 3 which, in actuality, are enclosed in the housing of motor 2 and are part of light passages 10 to be described with reference to FIG. 2. The opposed light sources 4 of FIG. 1 rotate within a collar 5 (also part of the housing of motor 2). The collar 5 serves as a support means for arranging at least one light guide channels 7 in an operative relationship with the at least one light source 4. Preferably, there are a plurality of light guide channels 7 spaced apart from each other and uniformly distributed about at least a section of the collar 5. In one embodiment, the light guides comprise bundles of optical fibers. The collar 5 comprises faces 6 interrelated to bundles of optical fibers comprising light guide channels 7. The reflectors 3 project circular light spots 8 onto the front faces 6. In a preferred embodiment, both light sources 4 are operating; however, in case of a failure of one of them, the motor speed may be doubled and the remaining light source may then serve the same function as both opposed light sources 4. In another embodiment which accommodates different lighting fixtures having different desired amount of illumination intensities, light sources with different output levels are provided so that their produced light is directed, by way of light guide channels 7 to the corresponding lighting fixtures.

FIG. 2 shows an electrically commutated d.c. motor 2, on whose stator 9 light passages 10 are arranged and to which passages light guide channels 7 (not shown) are joined radially frown the outside. The arrangement of one of the light passages 10 is further shown in FIG. 2A showing a section of the motor 2 partially cut away so as to more clearly illustrate the interface between the light passage 10 and a light source 4. The one or more light sources 4 are located about the periphery of the rotor and at a right angle to the rotor axis 1A. The light source 4 may be located at the same or different planes relative to each other so long as the corresponding light guides are in alignment thereto. The stator 9 shown in FIG. 2 furthermore includes two primary windings 11, 11' of a transformer, which correspond to and cooperate with secondary windings 12, 12' of the same transformer. The secondary windings 12, 12' are firmly connected to the rotor shaft 1.

As can be seen in FIG. 2, axial gaps are provided between the windings 11, 11' and 12, 12'. It is also possible and might even be more favorable to provide a radial division or gap between primary and secondary windings. For such a situation, the bearing forces occurring as a consequence of the electrical gap forces are somewhat lower. The gaps between primary and secondary windings are shown more clearly in FIG. 4 to be described.

Figure 4:
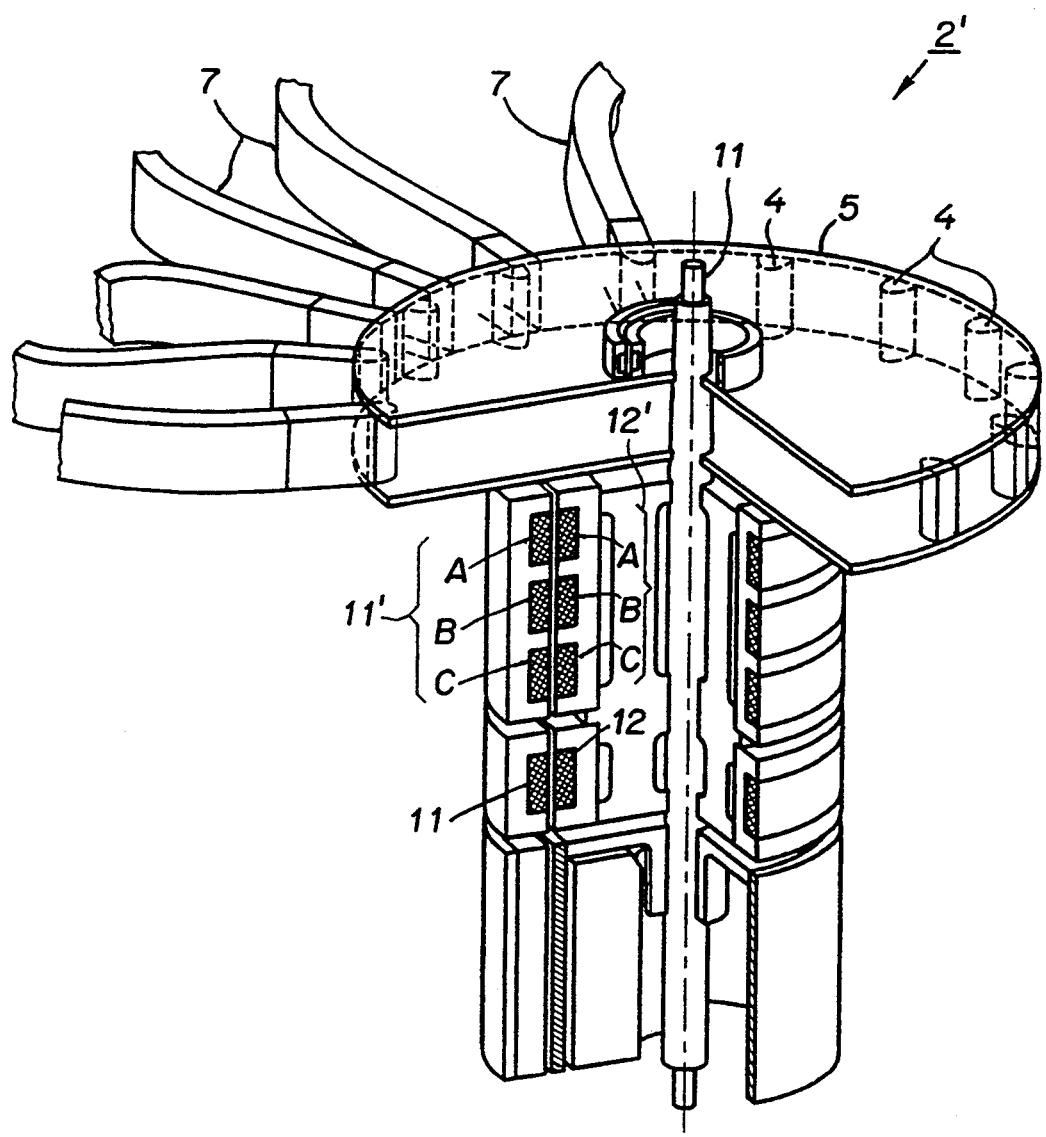
FIG. 4 is a diagrammatic view of a light generator similar to that shown in FIG. 2.

For good interlocking between the primary and secondary windings, it is favorable to distribute the windings among individual grooves, adjacent grooves having opposite winding directions, so that magnetic flux runs over the annular ribs between the grooves shown in FIG. 4. FIG. 4 shows an arrangement of a motor 2' having primary windings 11' (comprising windings A, B and C each arranged in an individual groove) and 11 and secondary windings 12' (comprising windings A, B and C each arranged in an individual groove) and 12.

Furthermore, and again with reference to FIG. 2, a light source carrier disk 13 is fastened to rotor shaft 1, on which carrier disk 13 a number of flash lamps 4, metallized on the outside for electrical contact thereof, are disposed in such a way that their peripheral radiating faces are rotated past the light passages 10 as closely as possible. For this arrangement, it is preferred to make the shape of emitting faces of the flash lamps 4 and the corresponding receiving faces of the light passages 10 both round, so that a corresponding gap between devices 4 and 10 of equal width is formed. At the same time, carrier disk 13 constitutes the plate or conductive member associated with at least part of the circuit means, to be described, for energizing the light sources.

The flash lamps 4 are equally spaced along the periphery of the carrier disk 13, which furthermore carries one-half (indicated by reference number 21') of a control transformer for the transfer of electronic firing signals to flash lamps 4. The other half (indicated by reference number 21) of the control transformer is arranged on stator 9.

Primary windings 11, 11' comprise a circuit means supply unit for the transfer of energy (transformer output approximately 100 W) to flash lamps 4, while the other secondary windings 12, 12' comprise a circuit means supply unit for motor drive and additional functions explained later on (transformer output approximately 30 W), but which can also supply energy to the flash lamps if necessary.

Circuit means supply circuits are known per se. Because of the lower leakage losses and the possibility to arrange different secondary windings at the rotor and- /or stator, a resonant circuit means supply unit is preferred.

Figure 3:
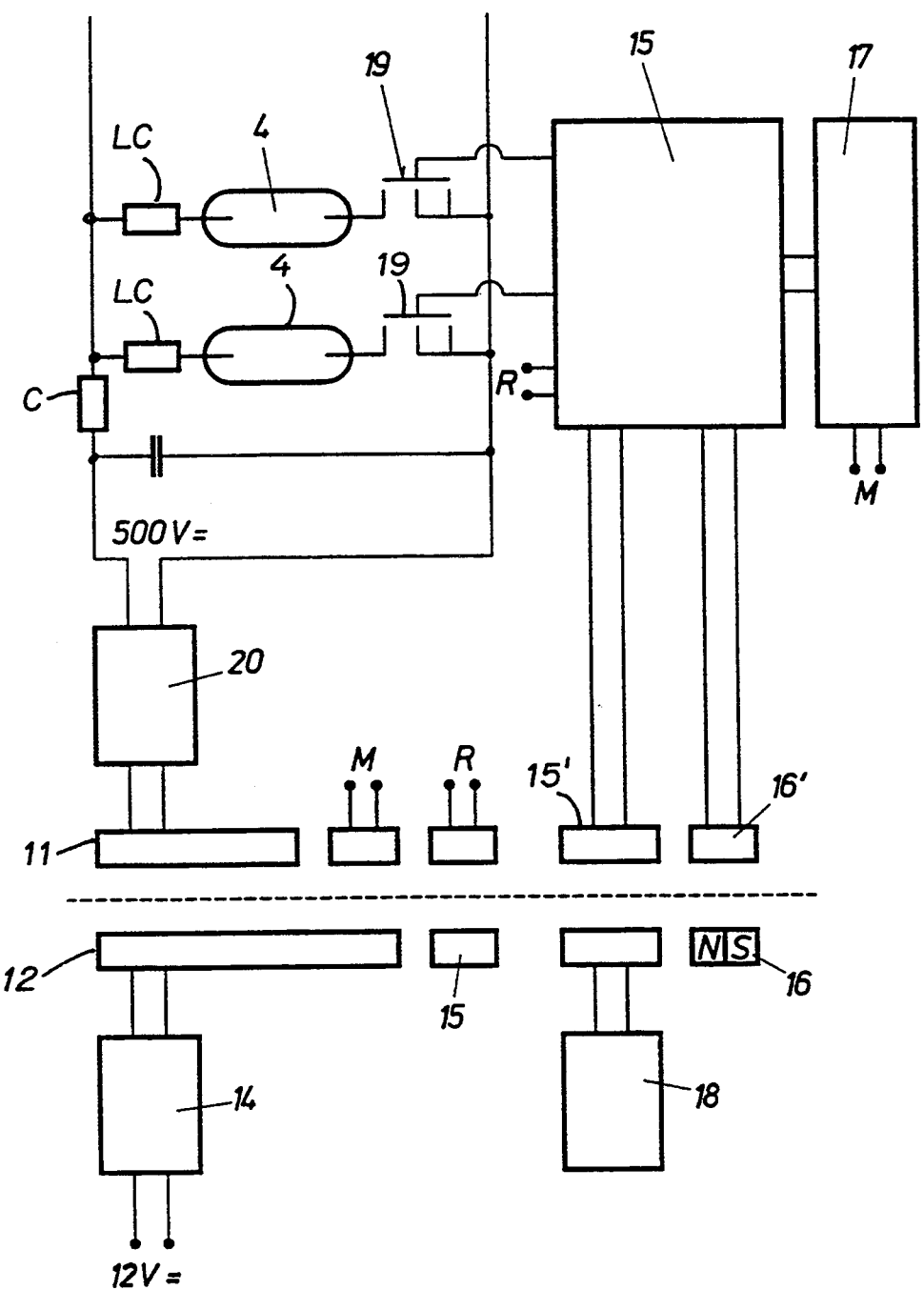
FIG. 3 is a corresponding block diagram of the generator.

FIG. 3 shows a diagrammatic circuit arrangement for a light generator in the form of an electronically-commutated d.c. motor, the primary winding of which is fed via a switch controller 14 having applied thereto 12 V. Furthermore, there is energy supply 15' to operate a computer unit 15 and used in the control of the motor. At the periphery, of the stator, magnetic marks 16 are furthermore arranged, which are scanned/read by a corresponding reading coil with C-core 16' at the rotor and which marks show the position of the rotor relative to the stator, so that, by means of processing computer 15, the flash lamps may be fired at the right time with respect to the rotation of the rotor and with respect to the location of the light guide channels 7 to be illuminated. For this usage, one of the magnetic marks 16 at the stator is oppositely polarized with respect to the others and serves as a zero or reference mark.

In operation, initially, the motor starts running up to a quartz stabilized rotational speed without its rotor position being controlled with respect to the stator. Finally, the informational data of the stator, supplied by coil 16' to the control computer 18, is used by control computer 18 to generate data input signals which are applied to the rotor and are used for controlling the light generated by light sources 4; i.e., which vehicle light source 4 is to be switched on while it is operational relation with the appropriate light guide 7. Processing computer 15 is a microprocessor controlling the firing of the individual flash lamps, via one or more power switches 19, connected respectively, to one or more rotating light sources 4. The rotating flash lamps are activated at the right moment, with respect to the stationary light guides 7, according to the data transmitted by computer 18.

It can be seen that the transformer output (secondary side) is some 500 V, a secondary circuit controller 20 being provided to condition such 500 V. A capacitor (C) having a typical value of 20 microfarads may be connected in series to flash lamps 4. Depending on the embodiment, an LC module may also be connected in series to each flash lamp 4 which have an output of about 6 W.

The lighting system according to the invention may comprise all the lighting fixtures of the vehicle; i.e., in case of a motor vehicle, these fixtures may include everything from dashboard lighting to main beam forward lighting, or any part thereof. Provisions may be made to provide "lighting floor" illumination for emergencies; that is to say, a light source/receiving collar arrangement not normally in operation, which further comprises optical fibers that only direct or transport light to the lighting fixtures that are indispensable for driving the vehicle to a garage.

Light guide channels 7, schematically illustrated in FIG. 1, in one embodiment are in the form of bundles of optical fibers having mutually similar optical fibers of different cross-sectional forms and which forms are known. Such bundles generally employ fibers of round cross-section, but may also employ bundles of capillaries and bundles having fibers of hexagonal cross-section. These known bundles, for the most part, have a relatively high portion of voids over their cross-section; i.e., the regions between the individual fibers where there is no transmission of light and which increase the volume of the bundle without serving any useful purpose.

With the lighting systems according to the invention, foil stacks comprising light guide channels are preferred. This arrangement of foil stacks give maximum utilization of the cross-section of the light guides and have good flexibility that is helpful for their preferential placement within the vehicle.

Optically weak points inherent in the transmission of light by means of bundles of optical fibers are manifested as coupling spots between the bundles and the adjacent elements; e.g., the emitter lenses of the lighting fixtures, such as that for the main beam of the vehicle. According to the invention, transparent or non-transparent slip-on sleeves are provided for that purpose, which enclose a central transparent element and confine its light thereto. These slip-on sleeves may comprise silicon rubber which elastically cling to the surfaces of the two components; i.e., lens and bundle, to be connected. Alternatively, provisions may be made for introducing a transparent self-curing mass, preferably comprising silicon rubber into the slip-on sleeve prior to the insertion of the sleeve onto the second element, such as the lens.

The bundles of optical fibers are preferably also formed of plastic material, it being necessary to provide for as low a temperature strain, as possible, from the environment to which the bundles are subjected and within which the bundles are connected. This may be ensured, for example, by coatings of low thermal conductivity being placed on the bundles of the optical fiber.

Preferably, it may furthermore be provided in known manner to first maneuver bundles of the optical fibers to the individual lighting units and then guide or maneuver the fibers onto the instrument panel (dashboard) in the interior of the vehicle. This arrangement may be similar to that described in U.S. Pat. No. 3,761,706 which is herein incorporated by reference.

The advantages obtainable by the lighting system according to the invention may be briefly summarized as follows: efficient light transmission from the light source to the optical fibers; lower risk of total failure of the lighting system because of the use of several light sources; efficient use of the light intensity of the light source and, therefore, efficient use of the available energy; variable choice of color because of the selection of light sources that provide a color in the electromagnetic spectrum which may be similar to conventionally used sunshine for lighting purposes, or which may be a color other than that of sunlight; direct display of light intensities because of apportioning or redistributing of the available light intensity of the light source to desired location by means of tapering or tapping of optical fibers; and lastly, the combination of adequately arranged optical fibers and the control of the firing movement of the light sources with respect to their associated light guides so as to provide various lighting ranges for the light generator of the present invention.

I claim:

1. A lighting system comprising:
    a central light-producing unit having a defined axis and at least one light source for emitting light in a defined angular zone in a substantially radial direction with respect to said axis,
    means for rotating said light source about said axis,
    means for energizing said light source to emit light in a pulsating manner as a function of the rotational position of said light source, and a plurality of light guides, each having an input end arranged circumferentially on a support means around said light source for receiving and guiding light produced by said light source to a lighting fixture associated with said light guide adjacent an output end thereof, said means for energizing said light source being coordinated with the rotational position of said light source relative to said light guide input ends, said light source being energized to emit light only when said light source is at a rotational position whereby said angular zone overlaps one of said input end of one of said light guide desired to be illuminated.

2. A lighting system according to claim 1, wherein said plurality of light guides are spaced apart from each other and uniformly distributed about said support means.

3. A lighting system according to claim 1, wherein each said light guide comprises a bundle of optical fibers.

4. A lighting system according to claim 1, wherein said support means includes a collar having one surface facing inward toward said light source and its opposite surface facing outward, said outward facing surface having provisions to receive the connection of said light guides thereto.

5. A lighting system according to claim 4, wherein said at least one light source is selected from the group comprising a gas discharge lamp, a halogen lamp and a laser diode.

6. A lighting system according to claim 4, wherein said gas discharge lamp is of a short-term controllable type having relatively fast turn on and turn off times.

7. A lighting system according to claim 4, wherein said gas discharge lamp is of a spontaneous ignition type.

8. A lighting system according to claim 4, wherein said gas discharge lamp is a xenon type.

9. A lighting system according to claim 4, wherein said halogen lamp has a heated filament.

10. A lighting system according to claim 1, wherein said at least one light source is selected to provide a color in the electromagnetic spectrum which is similar to sunshine.

11. A lighting system according to claim 1, wherein said at least one light source is selected to provide a color in the electromagnetic spectrum which is different from sunshine.

12. A lighting system according to claim 1, wherein said means for rotating said at least one light source comprises a motor having a rotor with a periphery and an axis corresponding to said defined axis.

13. A lighting system according to claim 12, wherein said light-producing unit comprises a plurality of light sources spaced apart from each other and located about the periphery of the rotor and at a right angle to the rotor axis, said light sources being located in the same plane relative to each other.

14. A lighting system according to claim 12, wherein said light-producing unit comprises a plurality of light sources spaced apart from each other and located about the periphery of the rotor and at a right angle to the rotor axis, said light sources being located in different planes relative to each other.

15. A lighting system according to claim 12, wherein electrical energy is coupled to said rotor by brushes and collector rings.

16. A lighting system according to claim 12, wherein electrical energy is inductively coupled to said rotor without any contact.

17. A lighting system according to claim 16, wherein said motor includes a rotatable two-part transformer which in turn includes a core and primary and secondary windings, said transformer being interconnected to circuit means, said primary and secondary windings being respectively connected to the stator and rotor of the motor.

18. A lighting system according to claim 17, wherein said rotor comprises windings distributed among several corresponding ring grooves.

19. A lighting system according to claim 12, wherein said motor is of the d.c. type and its rotor winding is electronically commutated, said rotor being connected to said at least one light source.

20. A lighting system according to claim 18, wherein said circuit means comprises semiconductor power switches which respectively are connected to one side of said at least one light source.

21. A lighting system according to claim 20, wherein said semiconductor power switches are selected from the group comprising transistors and field effect transistors.

22. A lighting system according to claim 18, wherein said circuit means comprises one or more computer processors interconnected to and controlling the energization of said light sources.

* * * * *